(12) United States Patent
Cheng et al.

(10) Patent No.: US 11,379,487 B2
(45) Date of Patent: Jul. 5, 2022

(54) INTELLIGENT AND INTERACTIVE KNOWLEDGE SYSTEM

(71) Applicant: International Business Machines Corporation, Armonk, NY (US)

(72) Inventors: Ching-Wei Cheng, New Taipei (TW); Yu-chun Lin, Taipei (TW); Hsin-Yu Hsieh, Taipei (TW); Chih-Hsiung Liu, Taipei (TW); Tsai-Hsuan Hsieh, Taoyuan (TW)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 16/113,926

(22) Filed: Aug. 27, 2018

(65) Prior Publication Data
US 2020/0065680 A1 Feb. 27, 2020

(51) Int. Cl.
*G06F 16/00* (2019.01)
*G06F 7/00* (2006.01)
(Continued)

(52) U.S. Cl.
CPC ...... *G06F 16/2457* (2019.01); *G06F 16/2453* (2019.01); *G06F 16/90332* (2019.01); *G06F 16/90335* (2019.01); *G06F 16/951* (2019.01)

(58) Field of Classification Search
CPC ........... G06F 16/24534; G06F 16/9535; G06F 16/90335; G06F 16/90332; G06F 16/951;
(Continued)

(56) References Cited

U.S. PATENT DOCUMENTS

| 8,352,388 B2 | 1/2013 | Estes |
| 8,959,080 B2 | 2/2015 | Lang et al. |

(Continued)

FOREIGN PATENT DOCUMENTS

CN 103853831 A 6/2014

OTHER PUBLICATIONS

Li et al., "An Agent Based Intelligent Meta Search Engine," F.L. Wang et al. (Eds.), Web Information Systems and Mining (WISM), Lecture Notes in Computer Science, vol. 7529, Springer, Berlin, Heidelberg, Germany, 2012, pp. 572-573.

(Continued)

*Primary Examiner* — Raquel Perez-Arroyo
(74) *Attorney, Agent, or Firm* — Yee & Associates, P.C.

(57) ABSTRACT

Enhancing a data query is provided. A knowledge base is searched for information corresponding to the data query. It is determined whether a query result is greater than a query result threshold level of information for the data query based on an identified query intent and keywords of the data query. In response to determining that the query result is not greater than the query result threshold level of information for the data query, a set of questions is sent to a personal digital agent of a client device that sent the data query for additional information based on the identified query intent and keywords. Analytic concepts answering the set of questions are received from analytic modules of the personal digital agent that are based on IoT-based personal data corresponding to a user of the client device. The data query is enhanced using the analytic concepts.

20 Claims, 6 Drawing Sheets

(51) Int. Cl.
  *G06F 16/2457* (2019.01)
  *G06F 16/951* (2019.01)
  *G06F 16/9032* (2019.01)
  *G06F 16/903* (2019.01)
  *G06F 16/2453* (2019.01)

(58) Field of Classification Search
  CPC ... G06F 16/2457; G06F 16/2453; G06N 5/04; G06N 5/02
  USPC .......................................................... 707/713
  See application file for complete search history.

(56) References Cited

U.S. PATENT DOCUMENTS

| | | |
|---|---|---|
| 8,983,926 B2 | 3/2015 | Cai et al. |
| 2008/0147644 A1 | 6/2008 | Aridor et al. |
| 2016/0180222 A1* | 6/2016 | Sierhuis ................. G06F 7/023 706/47 |
| 2017/0242899 A1 | 8/2017 | Jolley et al. |
| 2018/0232376 A1* | 8/2018 | Zhu .......................... G06F 40/35 |
| 2018/0285741 A1* | 10/2018 | Marshall ................ G06N 5/043 |
| 2018/0293484 A1* | 10/2018 | Wang .................... G06F 16/638 |
| 2019/0347358 A1* | 11/2019 | Mishra .................. G06F 40/295 |

OTHER PUBLICATIONS

Gotz et al., "Interactive Visual Synthesis of Analytic Knowledge", IEEE Symposium On Visual Analytics Science And Technology, Baltimore, MD, 2006, pp. 51-58.

* cited by examiner

INTELLIGENT AND INTERACTIVE KNOWLEDGE SYSTEM

BACKGROUND

1. Field

The disclosure relates generally to knowledge-based systems and more specifically to providing an intelligent and interactive knowledge system that enhances data queries using Internet of Things-based personal data corresponding to respective users of client devices that sent the data queries.

2. Description of the Related Art

A knowledge-based system is a computer program that reasons and uses a knowledge base to solve problems and respond to queries. A knowledge base stores structured and unstructured information, which is used by the knowledge-based system. Knowledge-based system is a broad term used to refer to many different kinds of systems. However, all knowledge-based systems attempt to represent knowledge explicitly via tools, such as ontologies and rules, rather than implicitly via code the way a conventional computer program does. Typically, a knowledge-based system includes three sub-systems: a knowledge base, a user interface, and an inference engine. The knowledge base represents information and facts, often in the form of an ontology. The inference engine applies logical rules to the knowledge base to deduce new information.

Knowledge-based systems were first developed by artificial intelligence researchers. These early knowledge-based systems were primarily expert systems. In fact, the term knowledge-based system was often used synonymously with expert systems. The difference is that an expert system refers to the type of task the system is trying to assist with, whereas a knowledge-based system refers to the architecture of the system, which represents knowledge explicitly.

As knowledge-based systems became more complex the techniques used to represent the knowledge base became more sophisticated. Rather than representing information and facts as assertions about data, the knowledge base became more structured, representing information similar to object-oriented programming, such as, for example, hierarchies of classes and subclasses, relations between classes, and behavior of objects. As the knowledge base became more structured, reasoning could occur both by independent rules and by interactions within the knowledge base, itself.

The most recent advancement of knowledge-based systems has been to adopt to systems that use the Internet. The Internet often deals with complex, unstructured data that cannot be relied on to fit a specific data model. The technology of knowledge-based systems and especially the ability to classify objects on demand is ideal for such systems.

SUMMARY

According to one illustrative embodiment, a computer-implemented method for enhancing a data query is provided. A computer searches a knowledge base for information corresponding to the data query. The computer determines whether a query result is greater than a query result threshold level of information for the data query based on an identified query intent and keywords of the data query. In response to the computer determining that the query result is not greater than the query result threshold level of information for the data query based on the identified query intent and keywords, the computer sends a set of questions to a personal digital agent of a client device that sent the data query for additional information based on the identified query intent and keywords. The computer receives analytic concepts answering the set of questions from analytic modules of the personal digital agent that are based on IoT-based personal data corresponding to a user of the client device. The computer enhances the data query using the analytic concepts answering the set of questions. According to other illustrative embodiments, a computer system and computer program product for enhancing a data query are provided.

DETAILED DESCRIPTION

Figure 1:
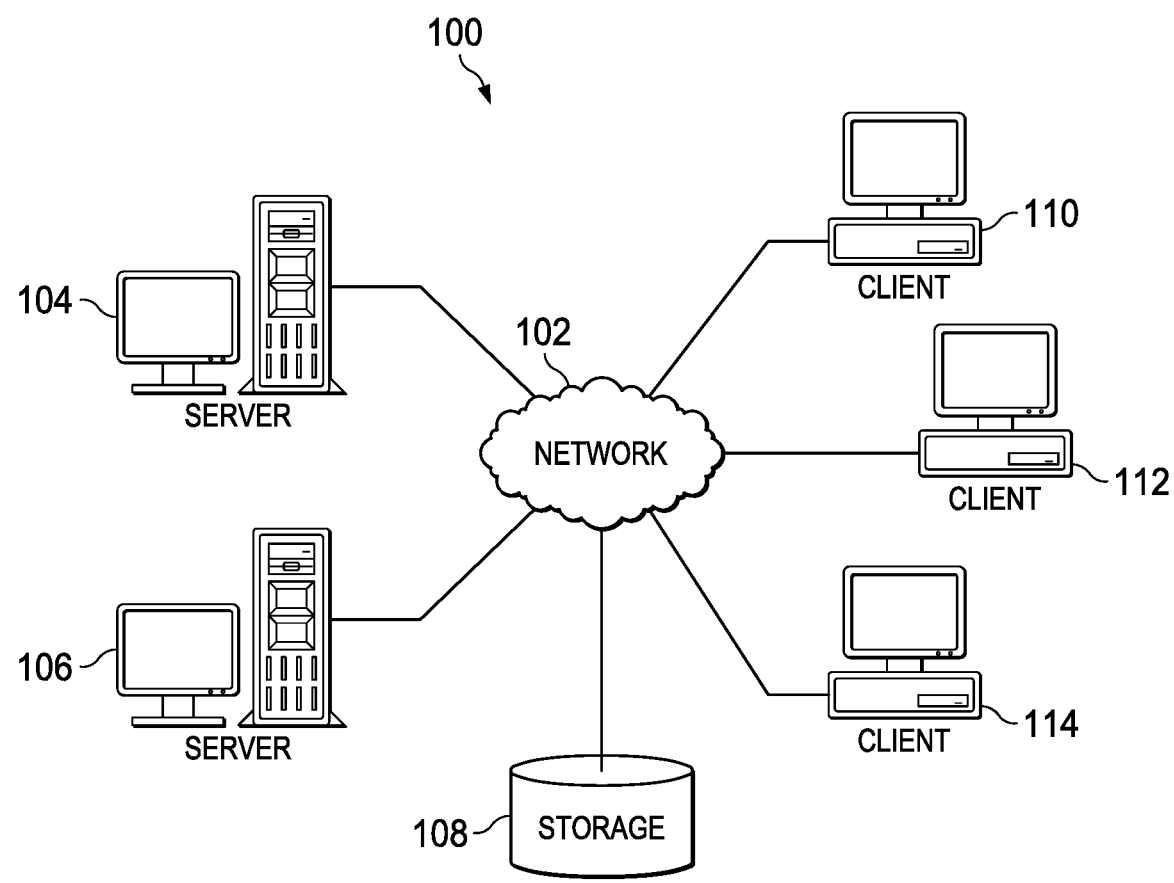
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
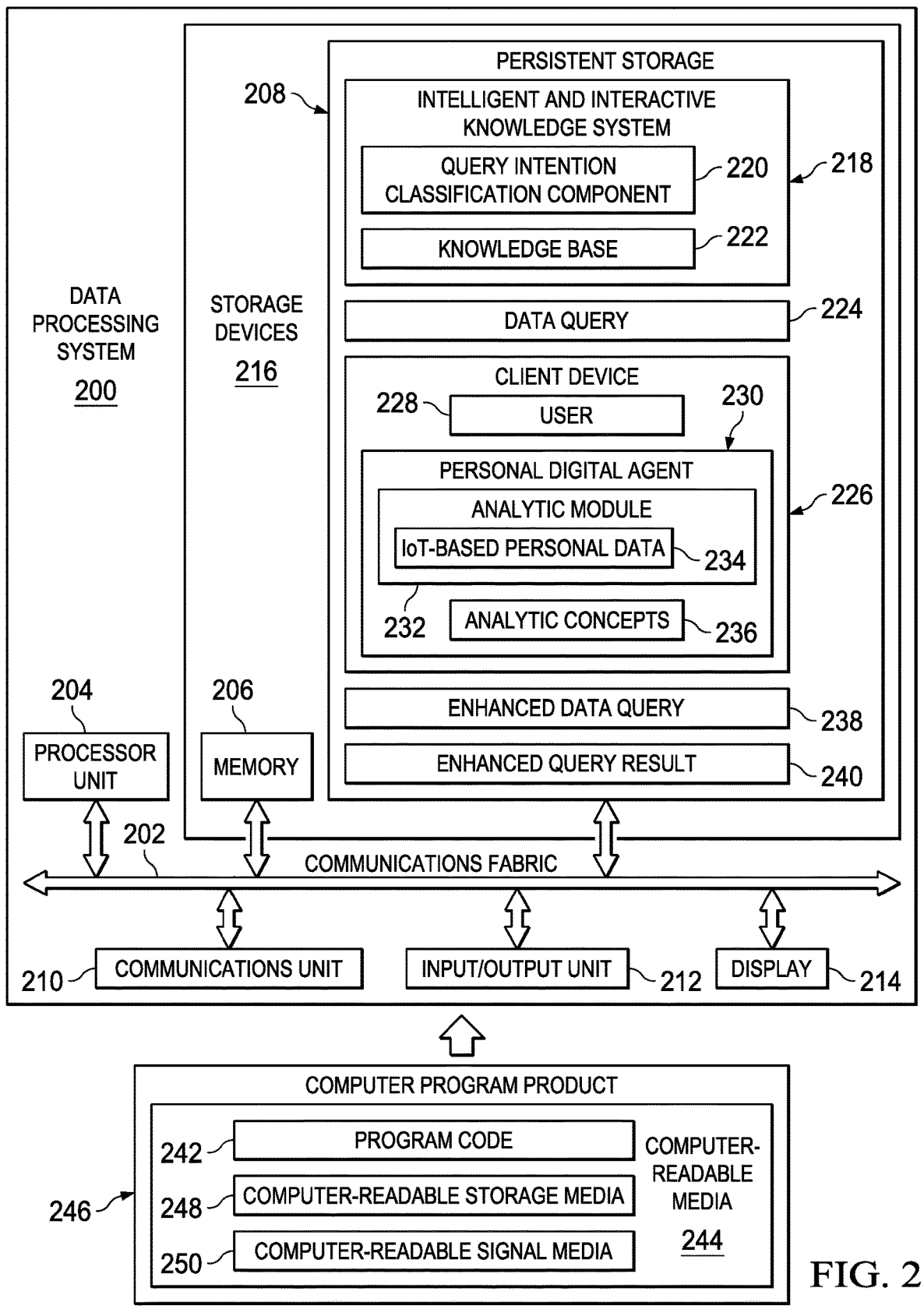
FIG. 2 is a diagram of a data processing system in which illustrative embodiments may be implemented.
Figure 3:
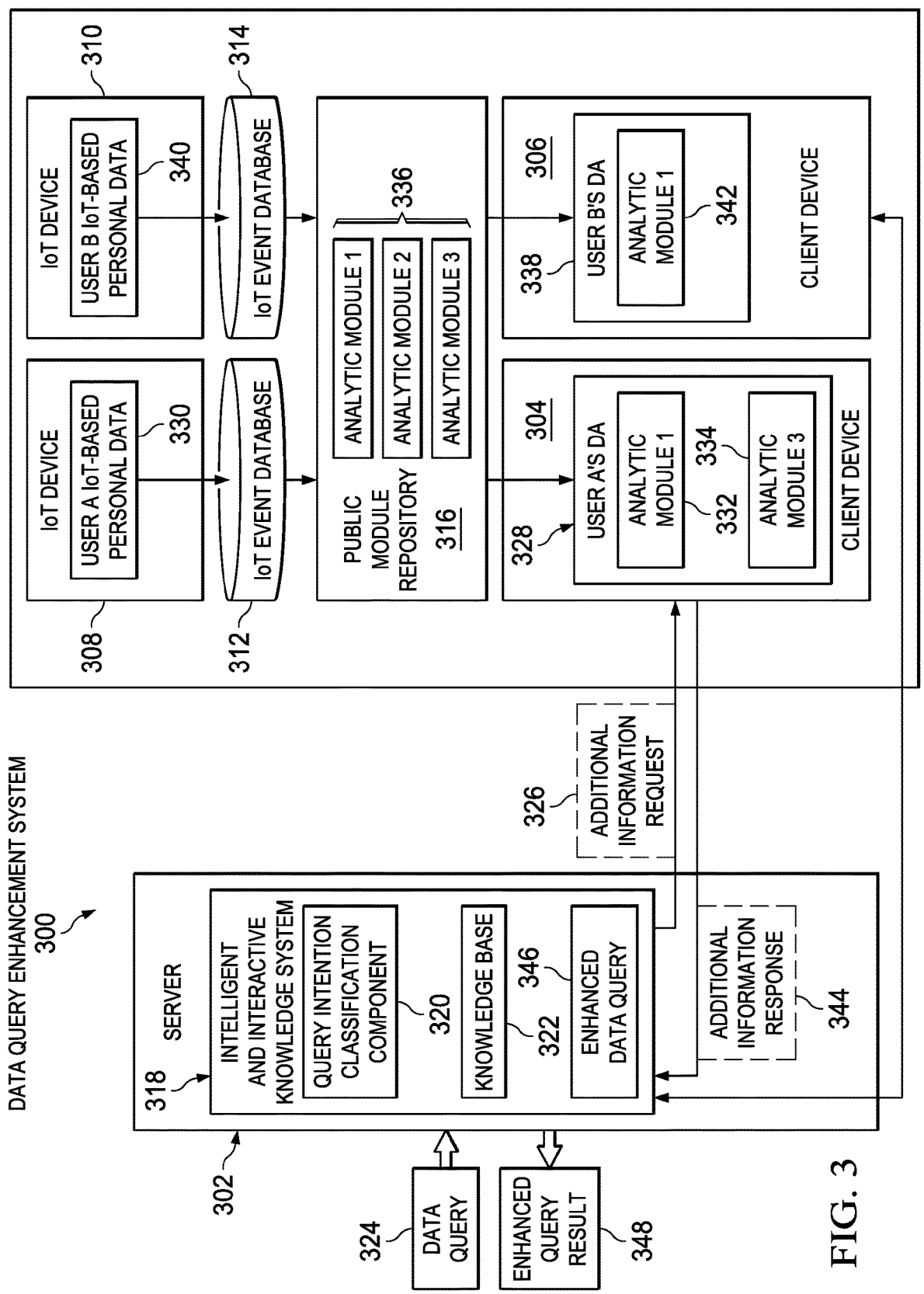
FIG. 3 is a diagram illustrating an example of a data query enhancement system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 provide a set of data query enhancement services to registered client devices. Moreover, server 104 and server 106 may each represent a cluster of servers in a data center hosting the data query enhancement services. Alternatively, server 104 and server 106 may represent nodes in a cloud environment providing the data query enhancement services.

Client 110, client 112, and client 114 also connect to network 102. In this example, clients 110, 112, and 114 are illustrated as desktop or personal computers. However, it should be noted that clients 110, 112, and 114 may represent other types of data processing systems, such as, for example, handheld computers, laptop computers, smart phones, smart watches, smart televisions, personal digital assistants, gaming systems, kiosks, and the like, with wired or wireless communication links to network 102. Users of clients 110, 112, and 114 may utilize clients 110, 112, and 114 to access the data query enhancement services provided by server 104 and server 106. Furthermore, server 104 and server 106 may provide other information, such as programs and applications, to clients 110, 112, and 114.

Storage 108 is a network storage device capable of storing any type of data in a structured format or an unstructured format. In addition, storage 108 may represent a plurality of network storage devices. Further, storage unit 108 may store, for example, identifiers and internet protocol addresses for a plurality of different client devices, identifiers for a plurality of client device users corresponding to the plurality of different client devices, identifiers and internet protocol addresses for a plurality of Internet of Things (IoT) devices corresponding to each respective client device user in the plurality of client device users, IoT-based personal data corresponding to each respective client device user in the plurality of client device users, analytic modules for analyzing IoT-based personal data, and the like. Furthermore, storage unit 108 may store other information, such as authentication or credential data that may include user names, passwords, and biometric data associated with the client device users and system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores intelligent and interactive knowledge system 218. However, it should be noted that even though intelligent and interactive knowledge system 218 is illustrated as residing in persistent storage 208, in an alternative illustrative embodiment intelligent and interactive knowledge system 218 may be a separate component of data processing system 200. For example, intelligent and interactive knowledge system 218 may be a hardware component coupled to communication fabric 202 or a combination of hardware and software components. In another alternative illustrative embodiment, a first set of components of intelligent and interactive knowledge system 218 may be located in data processing system 200 and a second set of components of intelligent and interactive knowledge system 218 may be located in a second data processing system, such as client 110 in FIG. 1. In yet another alternative illustrative embodiment, intelligent and interactive knowledge system 218 may be located in client devices in addition to or instead of data processing system 200.

Intelligent and interactive knowledge system 218 controls the process of enhancing data queries using additional information extracted from IoT data corresponding to client device users that sent the data queries. In this example, intelligent and interactive knowledge system 218 includes query intention classification component 220 and knowledge base 222. Intelligent and interactive knowledge system 218 utilizes query intention classification component 220 to identify query intent and keywords of received data queries, such as data query 224. Query intention classification component 220 may utilize, for example, natural language processing to identify the query intent and keywords of data query 224. Query intention classification component 220 may determine the query intent by extracting the context and semantic meaning of the keywords of data query 224. Keywords are words or phrases that have a particular meaning in the context of data query 224.

Data query 224 represents a request for information from knowledge base 222. Knowledge base 222 represents a data repository, such as a database, that stores and manages one or more collections of information. The collections of information may be from any information domain.

Client device 226 represents an identifier of a client device that sent data query 224 to data processing system 200. Client device 226 may be, for example, client 112 in FIG. 1. User 228 represents the user that input data query 224 into client device 226.

Client device 226 contains personal digital agent 230. Personal digital agent 230 is a software agent that performs tasks or services for user 228. These tasks or services are based on user input, location awareness, and an ability to access information from a variety of online sources.

Personal digital agent 230 includes analytic module 232. Analytic module 232 represents a set of one or more analytic modules. Each analytic module may analyze a different type of information. For example, one analytic module may analyze health-related data, another analytic module may analyze weather-related data, and yet another analytic module may analyze business-related data. In addition, different analytic modules may analyze different aspects of data in a same domain of information, such as a personal health information domain (e.g., one analytic module may analyze heat rate data, another analytic module may analyze skin temperature data, yet another analytic module may analyze respiration rate data, and so on).

In response to receiving a request for additional information corresponding to data query 224 from data processing system 200, personal digital agent 230 retrieves IoT-based personal data 234, which correspond to user 228, from one or more IoT event databases. IoT-based personal data 234 are generated by a set of one or more IoT devices, which correspond to user 228, and are stored in the IoT event databases for later retrieval. For example, the set of IoT devices may be wearables located on user 228 that monitor heart rate, blood pressure, skin temperature, activity level, and the like. However, it should be noted that the set of IoT devices are not limited to wearables, but may include other types of IoT devices, such as smart vehicles, smart phones, smart watches, smart televisions, smart appliances, smart thermostats, sensors, and the like, which collect information corresponding to user 228 and an environment surrounding user 228.

Personal digital agent 230 generates analytic concepts 236, which correspond to the query intent and keywords of data query 224, based on the analysis of IoT-based personal data 234 by analytic module 232. Analytic concepts 236 represent one or more statements or conclusions regarding IoT-based personal data 234 with regard to the query intent and keywords of data query 224. Client device 226 sends analytic concepts 236 to data processing system 200 in response to the request for additional information corresponding to data query 224.

Intelligent and interactive knowledge system 218 generates enhanced data query 238 based on analytic concepts 236. Enhanced data query 238 is a modified version of data query 224 that includes the requested additional information corresponding to data query 224. Intelligent and interactive knowledge system 218 utilizes enhanced data query 238 to retrieve information from knowledge base 222. Intelligent and interactive knowledge system 218 generates enhanced query result 240 from the information retrieved from knowledge base 222 based on enhanced data query 238. Enhanced query result 240 represents an augmented query result that contains an increased amount of information as compared to an amount of information returned by data query 224.

Communications unit 210, in this example, provides for communication with other computers, data processing systems, and devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra-high frequency, microwave, near field communication (NFC), Wi-Fi, Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keyboard, keypad, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 242 is located in a functional form on computer readable media 244 that is selectively removable and may be loaded onto or transferred to data processing system 200 for running by processor unit 204. Program code 242 and computer readable media 244 form computer program product 246. In one example, computer readable media 244 may be computer readable storage media 248 or computer readable signal media 250. Computer readable storage media 248 may include, for example, an optical or magnetic disc that is inserted or placed into a drive or other device that is part of persistent storage 208 for transfer onto a storage device, such as a hard drive, that is part of persistent storage 208. Computer readable storage media 248 also may take the form of a persistent storage, such as a hard drive, a thumb drive, or a flash memory that is connected to data processing system 200. In some instances, computer readable storage media 248 may not be removable from data processing system 200.

Alternatively, program code 242 may be transferred to data processing system 200 using computer readable signal media 250. Computer readable signal media 250 may be, for example, a propagated data signal containing program code 242. For example, computer readable signal media 250 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 242 may be downloaded over a network to persistent storage 208 from another device or data processing system through computer readable signal media 250 for use within data processing system 200. For instance, program code stored in a computer readable storage media in a data processing system may be downloaded over a network from the data processing system to data processing system 200. The data processing system providing program code 242 may be a server computer, a client computer, or some other device capable of storing and transmitting program code 242.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 248 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

When using a knowledge system, such as, for example, a question answering system or a chatbot, to query information, a user usually needs to input the query manually, which increases user cost in effort and time. In addition, the user may not be aware that the query is related to recent circumstances and situations occurring around the user. As a result, the user is not able to specify what information is needed to obtain a complete, quality query result.

No matter how powerful the knowledge system is, the user still cannot receive a quality query result when: 1) the query input describing a problem is insufficient; 2) a user is not aware of the relationship between personal data corresponding to the user and the problem; and 3) the query input is insufficient to infer a causal relationship between the problem and a solution. Illustrative embodiments provide an intelligent and interactive knowledge system, which assists users to refine queries via IoT-based personal digital agents. Internet of Things is a network of physical devices, such as, for example, wearables, vehicles, home appliances, and other items, embedded with electronics, software, sensors, actuators, and connectivity, which enable these things to connect and exchange information creating opportunities for more direct integration of the physical world into computer-based systems, resulting in efficiency improvements, economic benefits, and reduced human/device interaction.

Illustrative embodiments provide an intelligent and interactive knowledge system that automatically enhances query keywords with data provided by a personal digital agent located in a client device corresponding to a particular user.

Illustrative embodiments utilize the personalized digital agent to provide data to a trained model within the intelligent and interactive knowledge system. For example, the personal digital agent may fill chatbot slots of the intelligent and interactive knowledge system with additional data or information. The intelligent and interactive knowledge system works with the personal digital agent to refine query content based on information that the personal digital agent extracts from historical IoT-based personal data corresponding to a particular user. Illustrative embodiments perform this process without client device user intervention. Further, the personal digital agent analyzes the extracted historical IoT-based personal data to identify questions to ask the user to obtain more information from that particular user regarding the query.

The personal digital agent can gain insight into the user and generate personal data corresponding to the user based on the historical IoT-based personal data, social media data, and historical browser behavior, for example. Thus, the intelligent and interactive knowledge system of illustrative embodiments can provide more precise query results by automatically interacting with personal digital agents of client devices to uncover relationships between data queries and historical personal data corresponding to client device users.

Each user corresponds to a client device that contains the personal digital agent. Each personal digital agent has a unique uniform resource locator (URL) for access by the intelligent and interactive knowledge system. After a user submits a query to the intelligent and interactive knowledge system of illustrative embodiments, the intelligent and interactive knowledge system performs query intention classification to identify query intent and key entities, such as keywords or phrases, related to the original query. Then, the intelligent and interactive knowledge system searches its knowledge base for an appropriate answer to the query.

However, to provide a complete answer to the query, the intelligent and interactive knowledge system needs additional information. As a result, the intelligent and interactive knowledge system sends a set of one or more questions to the personal digital agent of the user's client device to obtain the additional information corresponding to the query. The personal digital agent automatically answers the set of questions based on information the personal digital agent extracts from previously collected and stored IoT-based personal data corresponding to the user. However, if the personal digital agent cannot answer one or more questions in the set of questions, then the personal digital agent displays the one or more unanswered questions to the user for manual input of the answers. The user returns the manually inputted answers to the personal digital agent for processing.

It should be noted that each personal digital agent contains a set of one or more analytical modules. The analytical modules are models that utilize, for example, deep learning neural networks or support vector machines, to find features and classify historical IoT-based personal data corresponding to a particular user. The analytical modules can weight the personal data according to timestamps (i.e., how current the personal data is). As a result, the analytical modules may identify a user's current physical condition and mental status, for example. The analytical modules then generate the analytic concept of personal data insight corresponding to the user based on the identified query intent and key entities.

Based on the additional information received from the personal digital agent, the intelligent and interactive knowledge system now performs an enhanced query search based on the identified original query intent and keywords and the query analysis additional personal data corresponding to the user, which the user was unaware of, that relates to the original query intent and keywords. Thus, illustrative embodiments provide an intelligent and interactive knowledge system that enhances data queries with IoT-based personal data corresponding to client device users. In addition, illustrative embodiments are able to generate complete and accurate data query results using discovered hidden personal data patterns and relationships between IoT events. Digital agents can extract high-level insights from various sources, as well as from other personal digital agents corresponding to other users. By using the intelligent and interactive knowledge system of illustrative embodiments, a user can provide minimal query input, but still receive a rich and accurate data query result based on the intent and context of the original query input and IoT-based personal data corresponding to the user. As a result, illustrative embodiments increase query result performance of a computer by using extracted IoT-based personal data, which correspond to the user and the query intent and keywords of the original data query submitted by the user, and decrease user cost in terms of data query input time and effort.

With reference now to FIG. 3, a diagram illustrating an example of data query enhancement system is depicted in accordance with an illustrative embodiment. Data query enhancement system 300 is a system of software and hardware components for automatically enhancing a data query using IoT-based personal data corresponding to a particular user of a client device that sent the data query. Data query enhancement system 300 may be implemented in a network of data processing systems, such as network data processing system 100 in FIG. 1.

In this example, data query enhancement system 300 includes server 302, client device 304, client device 306, IoT device 308, IoT device 310, IoT event database 312, IoT event database 314, and public module repository 316. However, it should be noted that data query enhancement system 300 is only meant as an example and not as a limitation on illustrative embodiments. In other words, data query enhancement system 300 may include any number of server computers, client devices, IoT devices, storage devices, and other devices not shown.

Server 302 may be, for example, server 104 in FIG. 1 or data processing system 200 in FIG. 2. Client device 304 and client device 306 may be, for example, client 110 and client 112 in FIG. 1. It should be noted that client device 304 and client device 306 correspond to User A and User B, respectively.

In this example, server 302 contains intelligent and interactive knowledge system 318, which includes query intention classification component 320 and knowledge base 322, such as intelligent and interactive knowledge system 218, query intention classification component 220, and knowledge base 222 of FIG. 2. Intelligent and interactive knowledge system 318 receives data query 324, such as data query 224 in FIG. 2, from a client device, such as client device 304. Intelligent and interactive knowledge system 318 utilizes query intention classification component 320 to identify a query intent and keywords corresponding to data query 324.

Intelligent and interactive knowledge system 318 searches knowledge base 322 for information related to the identified query intent and keywords corresponding to data query 324. In this example, intelligent and interactive knowledge system 318 determines that an insufficient level of information related to the identified query intent and keywords corresponding to data query 324 was found in the search of knowledge base 322 and determines that additional information is needed. As a result, in this example, intelligent and interactive knowledge system 318 sends additional information request 326 to client device 304, which corresponds to User A.

Client device 304 contains User A's personal digital agent 328. User A's personal digital agent 328 may be, for example, personal digital agent 230, which corresponds to user 228, in FIG. 2. User A's personal digital agent 328 retrieves User A's IoT-based personal data 330 from IoT event database 312, which stores User A's IoT-based personal data 330. User A's IoT-based personal data 330 may be, for example, IoT-based personal data 234, which corresponds to user 228, in FIG. 2. User A's IoT-based personal data 330, which are generated by IoT device 308, represent personal information corresponding to User A and User A's environment. It should be noted that IoT device 308 represents one or more IoT devices that correspond to User A.

After retrieving User A's IoT-based personal data 330, User A's personal digital agent 328 utilizes analytic module 332 and analytic module 334, such as analytic module 232 in FIG. 2, to extract the requested additional information from User A's IoT-based personal data 330. User A's personal digital agent 328 selects and downloads analytic module 332 and analytic module 334 from plurality of analytic modules 336 stored in public module repository 316 based on the type of IoT data retrieved. For example, analytic module 332 and analytic module 334 may each process and analyze a different type of IoT data, such as, for example, heart rate IoT data and skin temperature IoT data, respectively.

Similarly, if client device 306 received an additional information request from intelligent and interactive knowledge system 318, then client device 306 would utilize User B's personal digital agent 338 to retrieve User B's IoT-based personal data 340, which was generated by IoT device 310, from IoT event database 314. After retrieving User B's IoT-based personal data 340, User B's personal digital agent 338 utilizes analytic module 342 to extract the requested additional information from User B's IoT-based personal data 340.

After analytic module 332 and analytic module 334 extract the requested additional information from User A's IoT-based personal data 330, User A's personal digital agent 328 sends additional information response 344, which contains the requested additional information, to intelligent and interactive knowledge system 318. Intelligent and interactive knowledge system 318 uses the requested additional information contained in additional information response 344 to generate enhanced data query 346. Enhanced data query 346 may be, for example, enhanced data query 238 in FIG. 2. Enhanced data query 346 is a modification of data query 324 that includes the requested additional information for retrieving a sufficient level or amount of information above a threshold level of information from knowledge base 322 for User A's original information request based on the identified query intent and keywords corresponding to data query 324.

Intelligent and interactive knowledge system 318 generates enhanced query result 348 based on the information retrieved from knowledge base 322 using enhanced data query 346. Enhanced query result 348 may be, for example, enhanced query result 240 in FIG. 2. Intelligent and interactive knowledge system 318 sends query result 348 to client device 304 for User A's review and possible action based on query result 348.

Figure 4:
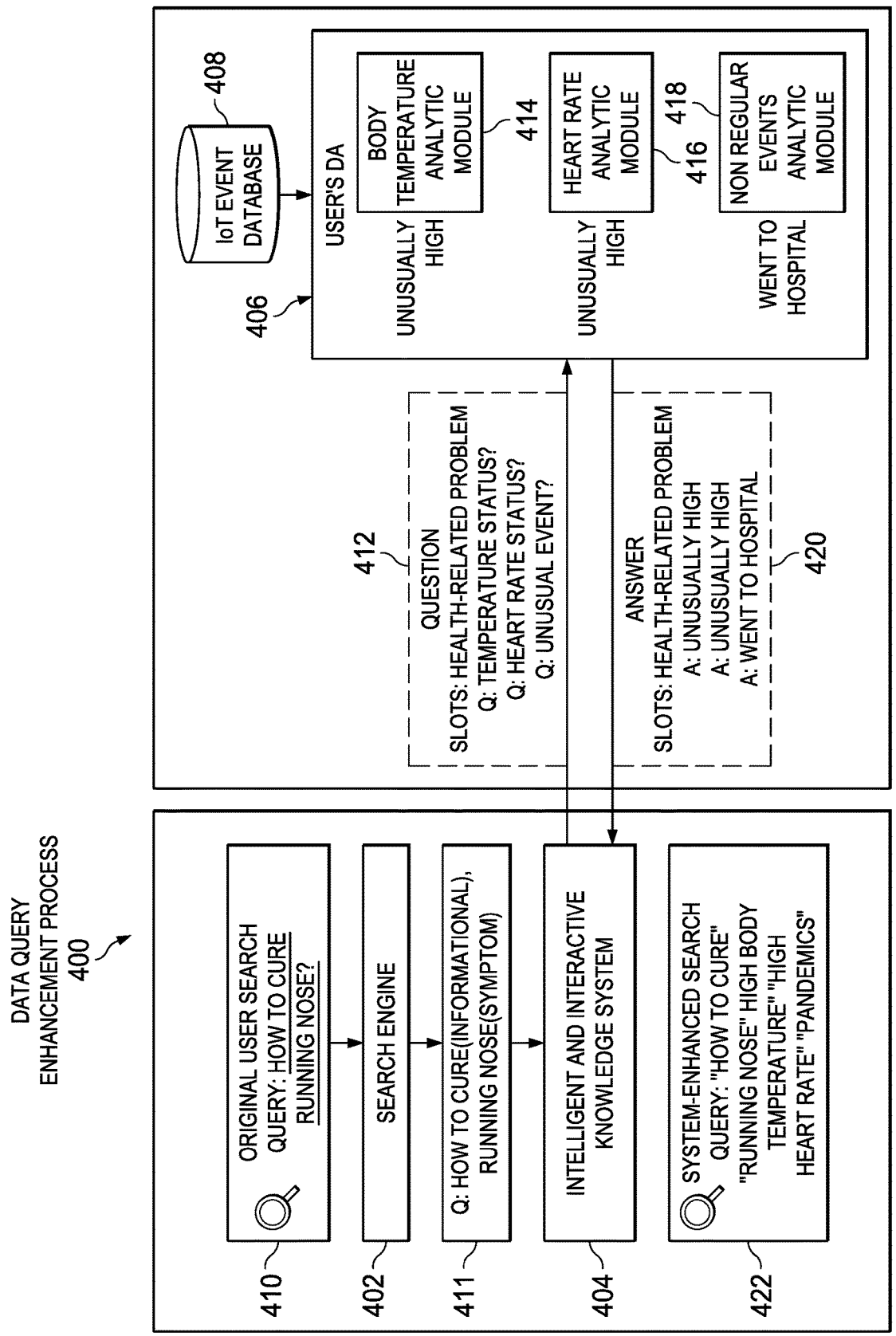
FIG. 4 is a diagram illustrating an example of a data query enhancement process in accordance with an illustrative embodiment.

With reference now to FIG. 4, a diagram illustrating an example of a data query enhancement process is depicted in accordance with an illustrative embodiment. Data query enhancement process 400 may be implemented in a data query enhancement system, such as, for example, data query enhancement system 300 in FIG. 3. In this example, data query enhancement process 400 includes search engine 402, intelligent and interactive knowledge system 404, User's personal digital agent 406, and IoT event database 408.

Search engine 402 is located in a client device, such as client device 304 in FIG. 3. User's personal digital agent 406 may be, for example, User A's personal digital agent 328 in FIG. 3. Intelligent and interactive knowledge system 404 and IoT event database 408 may be, for example, intelligent and interactive knowledge system 318 and IoT event database 312 in FIG. 3.

At 410, the user corresponding to the client device inputs an original user search query of "How to cure running nose?" into search engine 402. At 411, search engine 402 sends the original user search query to intelligent and interactive knowledge system 404 for processing. Intelligent and interactive knowledge system 404 identifies query intent and keywords corresponding to the original user search query using a query intention classification component, such as query intention classification component 320 in FIG. 3. At 412, intelligent and interactive knowledge system 404 fills health-related problem question slots with a set of questions regarding additional information corresponding to the identified query intent and keywords. In this example, the health-related problem questions are temperature status, heart rate status, and unusual event questions.

Intelligent and interactive knowledge system 404 sends the set of health-related problem questions to User's personal digital agent 406. In response to receiving the set of health-related problem questions, User's personal digital agent 406 extracts IoT-based personal data, which corresponds to the user of the client device and the set of health-related problem questions, from IoT event database 408.

After extracting the IoT-based personal data corresponding to the user of the client device and the set of health-related problem questions, User's personal digital agent 406 utilizes body temperature analytic module 414, heart rate analytic module 416, and non-regular events analytic module 418 to analyze the extracted data. In this example, based on the analysis of the extracted data, body temperature analytic module 414 indicates that the User's body temperature is unusually high, heart rate analytic module 416 indicates that the User's heart rate is unusually high, and non-regular events analytic module 418 indicates that others, such as the User's relative, went to the hospital with same or similar problems or symptoms.

At 420, User's personal digital agent 406 fills health-related problem answer slots with a set of answers related to the received health-related problem questions. In this example, the health-related problem answers are unusually high, unusually high, and went to hospital answers. At 422, intelligent and interactive knowledge system 404 generates a system-enhanced search query based on the received additional information provided by User's personal agent 406 in the set of health-related problem answers. Intelligent and interactive knowledge system 404 utilizes the system-enhanced search query to search a knowledge base, such as knowledge base 322 in FIG. 3, to generate an enhanced query result based on the query intent and keywords of the original user search query.

Figure 5:
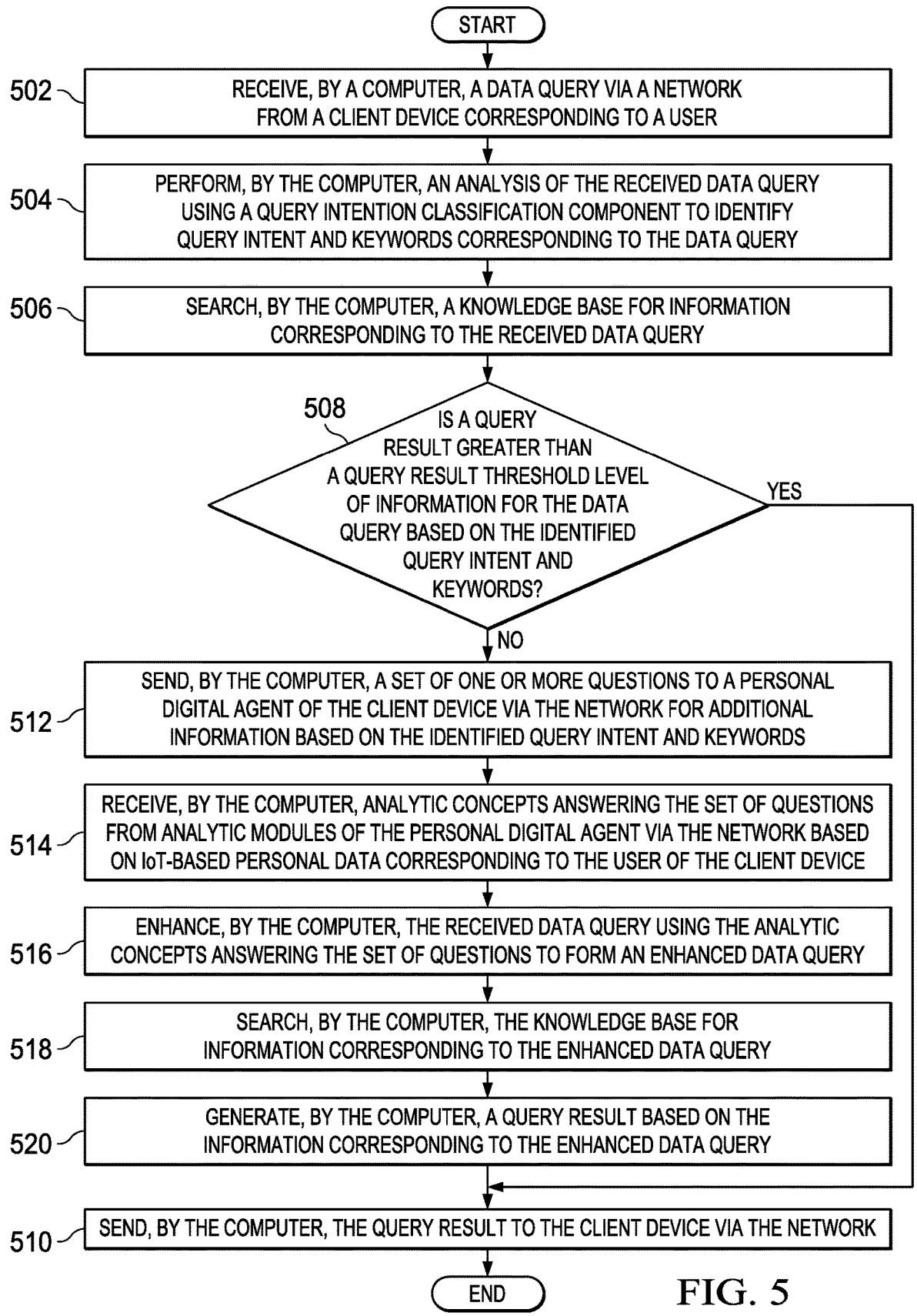
FIG. 5 is a flowchart illustrating a process for generating a query result based on an enhanced data query in accordance with an illustrative embodiment.

With reference now to FIG. 5, a flowchart illustrating a process for generating a query result based on an enhanced data query is shown in accordance with an illustrative embodiment. The process shown in FIG. 5 may be implemented in a computer, such as, for example, server 104 in FIG. 1 or data processing system 200 in FIG. 2.

The process begins when the computer receives a data query via a network from a client device corresponding to a user (step 502). The computer performs an analysis of the received data query using a query intention classification component to identify query intent and keywords corresponding to the data query (step 504). In addition, the computer searches a knowledge base for information corresponding to the received data query (step 506).

Afterward, the computer makes a determination as to whether a query result is greater than a query result threshold level of information for the data query based on the identified query intent and keywords (step 508). If the computer determines that the query result is greater than the query result threshold level of information for the data query based on the identified query intent and keywords, yes output of step 508, then the computer sends the query result to the client device via the network (step 510). Thereafter, the process terminates. If the computer determines that the query result is not greater than the query result threshold level of information for the data query based on the identified query intent and keywords, no output of step 508, then the computer sends a set of one or more questions to a personal digital agent of the client device via the network for additional information based on the identified query intent and keywords (step 512).

Subsequently, the computer receives analytic concepts answering the set of questions from analytic modules of the personal digital agent via the network based on IoT-based personal data corresponding to the user of the client device (step 514). The computer enhances the received data query using the analytic concepts answering the set of questions to form an enhanced data query (step 516). Afterward, the computer searches the knowledge base for information corresponding to the enhanced data query (step 518). The computer generates a query result based on the information corresponding to the enhanced data query (step 520). Thereafter, the process returns to step 510 where the computer sends the query result to the client device.

Figure 6:
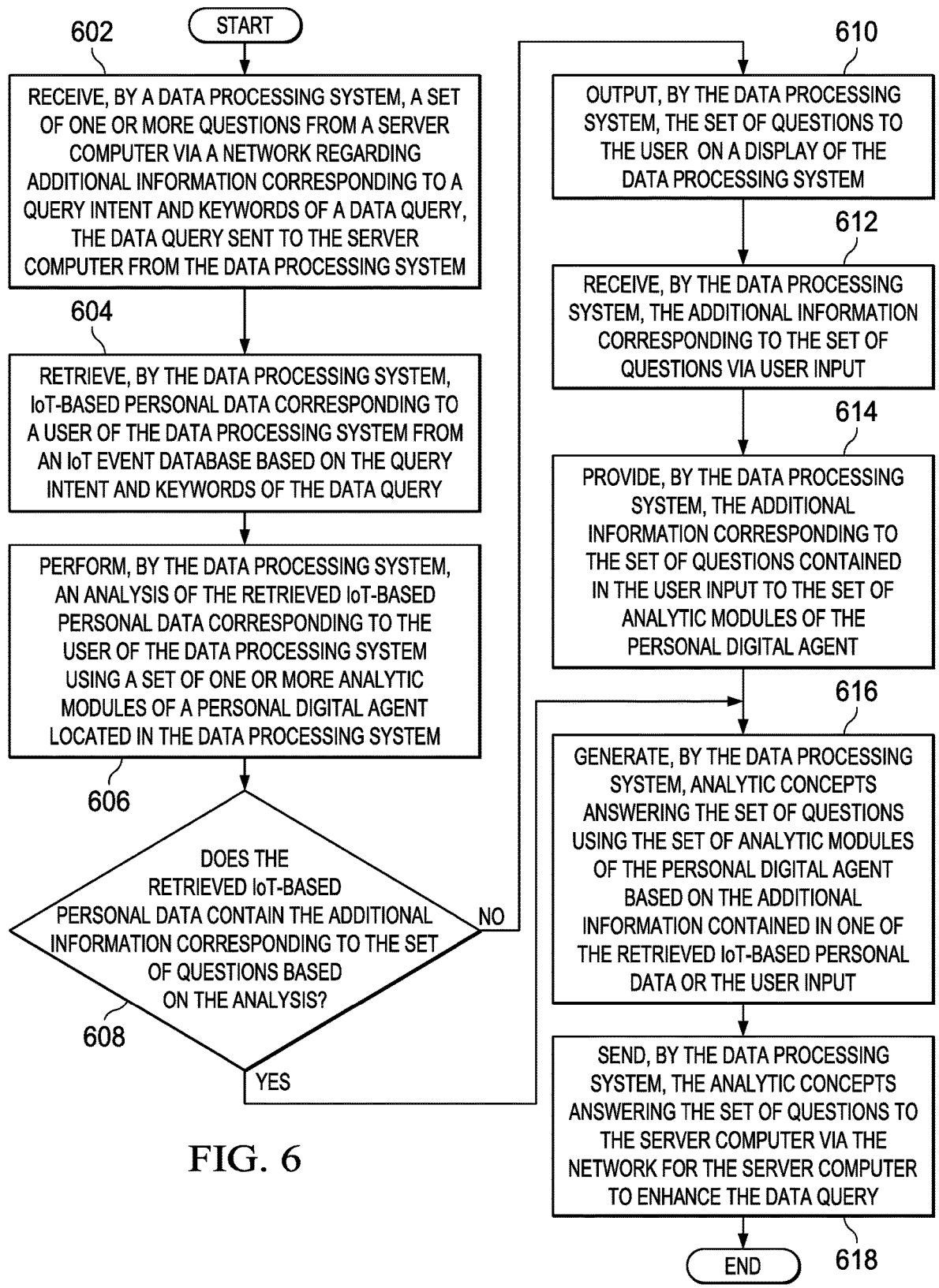
FIG. 6 is a flowchart illustrating a process for generating analytic concepts answering questions corresponding to a query intent and keywords of a data query in accordance with an illustrative embodiment.

With reference now to FIG. 6, a flowchart illustrating a process for generating analytic concepts answering questions corresponding to a query intent and keywords of a data query is shown in accordance with an illustrative embodiment. The process shown in FIG. 6 may be implemented in a data processing system, such as, for example, client 110 in FIG. 1.

The process begins when the data processing system receives a set of one or more questions from a server computer via a network regarding additional information corresponding to a query intent and keywords of a data query (step 602). It should be noted that the data processing system previously sent the data query to the server computer. The data processing system retrieves IoT-based personal data corresponding to a user of the data processing system from an IoT event database based on the query intent and keywords of the data query (step 604). Alternatively, the data processing system may retrieve the IoT-based personal data directly from a set of one or more IoT devices, which correspond to the user, that generated the IoT-based personal data.

The data processing system performs an analysis of the retrieved IoT-based personal data corresponding to the user of the data processing system using a set of one or more analytic modules of a personal digital agent located in the data processing system (step 606). Afterward, the data processing system makes a determination as to whether the retrieved IoT-based personal data contains the additional information corresponding to the set of questions based on the analysis (step 608). If the data processing system determines that the retrieved IoT-based personal data does not contain the additional information corresponding to the set of questions based on the analysis, no output of step 608, then the data processing system outputs the set of questions to the user on a display of the data processing system (step 610). Subsequently, the data processing system receives the additional information corresponding to the set of questions via user input (step 612). In addition, the data processing system provides the additional information corresponding to the set of questions contained in the user input to the set of analytic modules of the personal digital agent (step 614). Thereafter, the process proceeds to step 616.

Returning again to step 608, if the data processing system determines that the retrieved IoT-based personal data does contain the additional information corresponding to the set of questions based on the analysis, yes output of step 608, then the data processing system generates analytic concepts answering the set of questions using the set of analytic modules of the personal digital agent based on the additional information contained in one of the retrieved IoT-based personal data or the user input (step 616). The data processing system sends the analytic concepts answering the set of questions to the server computer via the network for the server computer to enhance the data query (step 618). Thereafter, the process terminates.

Thus, illustrative embodiments of the present invention provide a computer-implemented method, computer system, and computer program product for providing an intelligent and interactive knowledge system that enhances data queries for enhanced data query results. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for enhancing a data query, the computer-implemented method comprising:
searching, by a computer, a knowledge base in an interactive knowledge system for health-related problem information corresponding to the data query;
determining, by the computer, that a query result is greater than a query result threshold level of information for the data query based on a query intent and keywords of the data query identified via natural language processing;
responsive to the computer determining that the query result is not greater than the query result threshold level of information for the data query based on the query intent and the keywords, sending, by the computer, without user intervention, a set of health-related problem questions to a personal digital agent of a client device that corresponds to a user that sent the data query, for additional information based on the query intent and the keywords, wherein the additional information contains personal information corresponding to the user, and wherein the user is unaware that the personal information relates to the query intent and the keywords, wherein the set of health-related problem questions relate to the health-related problem information;
generating, by the personal digital agent, a number of analytic concepts based on answers received from the personal digital agent answering the set of health-related problem questions sent to the personal digital agent, wherein the answers come from a number of analytic modules of the personal digital agent that are downloaded from a public module repository based on a type of data sent to the personal digital agent;
receiving, by the computer, analytic concepts in answer to the set of health-related problem questions from analytic modules of the personal digital agent that are based on IoT-based personal data corresponding to the user, wherein the analytic modules utilize neural networks or support vector machines to weight and classify historical IoT-based personal data corresponding to the user based on a timestamp of the historical IoT-based personal data; and
automatically enhancing, by the computer, the data query without user intervention using the analytic concepts answering the set of health-related problem questions to form an enhanced data query indicating unusual conditions related to the health-related problem information, wherein the personal digital agent fills chatbot slots of the interactive knowledge system based on information that the personal digital agent extracts from the historical IoT-based personal data corresponding to the user, wherein the data query is enhanced by discovering personal data patterns and relationships between events in the historical IoT-based personal data.

2. The computer-implemented method of claim 1 further comprising:
searching, by the computer, the knowledge base for information corresponding to the enhanced data query; and
generating, by the computer, an enhanced query result based on the information corresponding to the enhanced data query.

3. The computer-implemented method of claim 2 further comprising:
receiving, by the computer, the data query via a network from the client device corresponding to the user; and
performing, by the computer, an analysis of the data query using a query intention classification component of the computer to identify the query intent and the keywords corresponding to the data query.

4. The computer-implemented method of claim 1, wherein in response to the personal digital agent receiving the set of health-related problem questions from the computer, the personal digital agent retrieves the IoT-based personal data corresponding to the user from an IoT event database based on the query intent and the keywords of the data query, performs an analysis of the IoT-based personal data corresponding to the user using a set of analytic modules of the personal digital agent, and determines that the IoT-based personal data corresponding to the user contains the additional information corresponding to the set of health-related problem questions based on the analysis.

5. The computer-implemented method of claim 4, wherein in response to the personal digital agent determining that the IoT-based personal data does not contain the additional information corresponding to the set of health-related problem questions based on the analysis, the personal digital agent outputs the set of health-related problem questions to the user on a display, receives the additional information corresponding to the set of health-related problem questions via user input, and provides the additional information corresponding to the set of health-related problem questions contained in the user input to the set of analytic modules of the personal digital agent.

6. The computer-implemented method of claim 4, wherein in response to the personal digital agent determining that the IoT-based personal data does contain the additional information corresponding to the set of health-related problem questions based on the analysis, the personal digital agent generates the analytic concepts answering the set of health-related problem questions using the set of analytic modules of the personal digital agent based on the additional information contained in one of the IoT-based personal data and sends the analytic concepts answering the set of health-related problem questions to the computer for the computer to enhance the data query.

7. The computer-implemented method of claim 6, wherein the IoT-based personal data corresponds to the user, and wherein the IoT-based personal data are generated by a plurality of IoT devices corresponding.

8. A computer system for enhancing a data query, the computer system comprising:
   a bus system;
   a storage device connected to the bus system, wherein the storage device stores program instructions; and
   a processor connected to the bus system, wherein the processor executes the program instructions to:
   search a knowledge base in an interactive knowledge system for health-related problem information corresponding to the data query;
   determine that a query result is greater than a query result threshold level of information for the data query based on a query intent and keywords of the data query identified via natural language processing;
   send, without user intervention, a set of health-related problem questions to a personal digital agent of a client device that corresponds to a user that sent the data query, for additional information based on the query intent and the keywords in response to determining that the query result is not greater than the query result threshold level of information for the data query based on the query intent and the keywords, wherein the additional information contains personal information corresponding to the user, and wherein the user is unaware that the personal information relates to the query intent and the keywords, wherein the set of health-related problem questions relate to the health-related problem information;
   generate a number of analytic concepts based on answers received from the personal digital agent answering the set of health-related problem questions sent to the personal digital agent, wherein the answers come from a number of analytic modules of the personal digital agent that are downloaded from a public module repository based on a type of data sent to the personal digital agent of a client device;
   receive analytic concepts in answer to the set of health-related problem questions from analytic modules of the personal digital agent that are based on IoT-based personal data corresponding to the user, wherein the analytic modules utilize neural networks or support vector machines to weight and classify historical IoT-based personal data corresponding to the user based on a timestamp of the historical IoT-based personal data; and
   automatically enhance the data query without user intervention using the analytic concepts answering the set of health-related problem questions to form an enhanced data query indicating unusual conditions related to the health-related problem information, wherein the personal digital agent fills chatbot slots of the interactive knowledge system based on information that the personal digital agent extracts from the historical IoT-based personal data corresponding to the user, wherein the data query is enhanced by discovering personal data patterns and relationships between events in the historical IoT-based personal data.

9. The computer system of claim 8, wherein the processor further executes the program instructions to: search the knowledge base for information corresponding to the enhanced data query; and generate an enhanced query result based on the information corresponding to the enhanced data query.

10. The computer system of claim 8, wherein the IoT-based personal data corresponds to the user, and wherein the processor further executes the program instructions to: receive the data query via a network from the client device corresponding to the user; and perform an analysis of the data query using a query intention classification component of the computer to identify the query intent and the keywords corresponding to the data query.

11. The computer system of claim 8, wherein the processor further executes the program instructions to: retrieve, responsive to the personal digital agent receiving the set of health-related problem questions from the computer, the IoT-based personal data corresponding to the user from an IoT event database based on the query intent and the keywords of the data query; perform an analysis of the IoT-based personal data corresponding to the user using a set of analytic modules of the personal digital agent; and determine that the IoT-based personal data corresponding to the user contains the additional information corresponding to the set of health-related problem questions based on the analysis.

12. The computer system of claim 11, wherein the processor further executes the program instructions to: output, responsive to the personal digital agent determining that the IoT-based personal data does not contain the additional information corresponding to the set of health-related problem questions based on the analysis, the set of health-related problem questions to the user on a display; receive the additional information corresponding to the set of health-related problem questions via user input; and provide the additional information corresponding to the set of health-related problem questions contained in the user input to the set of analytic modules of the personal digital agent.

13. The computer system of claim 11, wherein the processor further executes the program instructions to: generate, responsive to the personal digital agent determining that the IoT-based personal data does contain the additional information corresponding to the set of health-related problem questions based on the analysis, the analytic concepts answering the set of health-related problem questions using the set of analytic modules of the personal digital agent based on the additional information contained in one of the IoT-based personal data; and send the analytic concepts answering the set of health-related problem questions to the computer for the computer to enhance the data query.

14. A computer program product for enhancing a data query, the computer program product comprising a computer readable storage medium having program instructions embodied therewith, the program instructions executable by a computer to cause the computer to perform a method comprising:

searching, by a computer, a knowledge base in an interactive knowledge system for health-related problem information corresponding to the data query;

determining, by the computer, that a query result is greater than a query result threshold level of information for the data query based on a query intent and keywords of the data query identified via natural language processing;

responsive to the computer determining that the query result is not greater than the query result threshold level of information for the data query based on the query intent and the keywords, sending, by the computer, without user intervention, a set of health-related problem questions to a personal digital agent of a client device that corresponds to a user that sent the data query, for additional information based on the query intent and the keywords, wherein the additional information contains personal information corresponding to the user, and wherein the user is unaware that the personal information relates to the query intent and the keywords, wherein the set of health-related problem questions relate to the health-related problem information;

generating, by the personal digital agent, a number of analytic concepts based on answers received from the personal digital agent answering the set of health-related problem questions sent to the personal digital agent, wherein the answers come from a number of analytic modules of the personal digital agent that are downloaded from a public module repository based on a type of data sent to the personal digital agent;

receiving, by the computer, analytic concepts in answer to the set of health-related problem questions from analytic modules of the personal digital agent that are based on IoT-based personal data corresponding to the user, wherein the analytic modules utilize neural networks or support vector machines to weight and classify historical IoT-based personal data corresponding to the user based on a timestamp of the historical IoT-based personal data; and automatically enhancing, by the computer, the data query without user intervention using the analytic concepts answering the set of health-related problem questions to form an enhanced data query indicating unusual conditions related to the health-related problem information, wherein the personal digital agent fills chatbot slots of the interactive knowledge system based on information that the personal digital agent extracts from the historical IoT-based personal data corresponding to the user, wherein the data query is enhanced by discovering personal data patterns and relationships between events in the historical IoT-based personal data.

15. The computer program product of claim 14 further comprising: searching, by the computer, the knowledge base for information corresponding to the enhanced data query; and generating, by the computer, an enhanced query result based on the information corresponding to the enhanced data query.

16. The computer program product of claim 15 further comprising: receiving, by the computer, the data query via a network from the client device corresponding to the user; and performing, by the computer, an analysis of the data query using a query intention classification component of the computer to identify the query intent and the keywords corresponding to the data query.

17. The computer program product of claim 14, wherein in response to the personal digital agent receiving the set of health-related problem questions from the computer, the personal digital agent retrieves the IoT-based personal data corresponding to the user from an IoT event database based on the query intent and the keywords of the data query, performs an analysis of the IoT-based personal data corresponding to the user using a set of analytic modules of the personal digital agent, and determines that the IoT-based personal data corresponding to the user contains the additional information corresponding to the set of health-related problem questions based on the analysis.

18. The computer program product of claim 17, wherein in response to the personal digital agent determining that the IoT-based personal data does not contain the additional information corresponding to the set of health-related problem questions based on the analysis, the personal digital agent outputs the set of health-related problem questions to the user on a display, receives the additional information corresponding to the set of health-related problem questions via user input, and provides the additional information corresponding to the set of health-related problem questions contained in the user input to the set of analytic modules of the personal digital agent.

19. The computer program product of claim 17, wherein in response to the personal digital agent determining that the IoT-based personal data does contain the additional information corresponding to the set of health-related problem questions based on the analysis, the personal digital agent generates the analytic concepts answering the set of health-related problem questions using the set of analytic modules of the personal digital agent based on the additional information contained in one of the IoT-based personal data and sends the analytic concepts answering the set of health-related problem questions to the computer for the computer to enhance the data query.

20. The computer program product of claim 19, wherein the IoT-based personal data corresponds to the user, and wherein the IoT-based personal data are generated by a plurality of IoT devices corresponding to the user.

* * * * *